Patented June 5, 1951

2,555,944

UNITED STATES PATENT OFFICE 2,555,944

6 - CHLORO - 9 - (3 - (2 - HYDROXYETHYL-AMINO) - PROPYLAMINO) - 2 - METHOXY-ACRIDINE AND SALTS THEREOF

Alexander R. Surrey, Albany, N. Y., assignor to Sterling Drug Inc., Wilmington, Del., a corporation of Delaware No Drawing. Application January 22, 1949, Serial No. 72,269

3 Claims. (Cl. 260—279)

The present invention relates to new chemotherapeutically useful acridine compounds derived from a 9-aminoacridine, and the preparation thereof. More particularly, said acridine compounds are 6-chloro-9-(3-(2-hydroxyethylamino)propylamino) - 2 - methoxyacridine and acid addition salts thereof.

The compounds of this invention have been found to possess useful chemotherapeutic properties, especially as anthelmintic agents.

The basic acridine compound, 6-chloro-9-(3-2 - hydroxyethylamino) - propylamino-2-methoxyacridine can be prepared by various methods. However, the procedure preferred in practicing the invention involves heating a mixture of phenol and 6,9-dichloro-2-methoxyacridine to form 6-chloro-2-methoxy-9-phenoxyacridine hydrochloride (which need not be isolated), which is then heated with 3-(2-hydroxyethylamino) - propylamine. While the foregoing procedure is preferred in practicing my invention, other methods of preparing said basic acridine compound are operable. For example, 6,9-dichloro-2-methoxyacridine can be heated directly with 3 - (2 - hydroxyethylamino)propylamine without first reacting the former with phenol. In addition, the basic side chain can be attached stepwise to the acridine nucleus. In such a process, 6,9-dichloro-2-methoxyacridine or 6-chloro-2-methoxy - 9 - phenoxyacridine hydrochloride is heated with 3-hydroxypropylamine to give 6-chloro - 9 - (3 - hydroxypropylamino) - 2-methoxyacridine, which is then treated with a halogenating agent such as thionyl chloride to yield 6 - chloro - 9 - (3 - chloropropylamino) - 2-methoxyacridine, which, in turn, is treated with 2-hydroxyethylamine to give the desired basic acridine compound, 6-chloro-9-(3-(2-hydroxyethylamino)propylamino) -2-methoxyacridine.

The salts of the instant invention are prepared by treating the foregoing described basic acridine compound with the appropriate acid. In practicing my invention I found it convenient to employ the dihydrochloride salt. However, other salts are within the scope of the invention. Included among other salts which may be employed are the following, formed by reacting the base with the appropriate relatively non-toxic inorganic or organic acid: the dihydrobromide, diphosphate, disulfate, disulfamate, diethanesulfonate, ditartrate, dicitrate, disuccinate, diacetate, dibenzoate, dioleate, and the like.

The following examples will further illustrate specific embodiments of my invention.

Examples

*3-(2-hydroxyethylamino)-propylamine.* — 180 g. of acrylonitrile was added dropwise with stirring over a period of 90 minutes to 305 g. of 2-hydroxyethylamine, while maintaining the temperature below 30° C. After stirring for five hours the reaction mixture was heated on the steam bath for 30 minutes and then allowed to stand overnight at room temperature. After removal of the excess 2-hydroxyethylamine by distilling in vacuo, the reaction mixture was dissolved in 1.1 liters of ammoniacal ethanol (approx. 12%) and reduced catalytically with Raney nickel at 120° C., the initial hydrogen pressure being about 1300 pounds. The product, 3-(2-hydroxyethylamino)propylamine, was distilled at 105–114° C. at 1 mm.; $n_D^{25}$ 1.4845; yield 280 g.

*6 - chloro - 9 - (3 - (2 - hydroxyethylamino) - propylamino) - 2 - methoxyacridine dihydrochloride.*—A stirred mixture of 700 g. of phenol and 200 g. of 6,9-dichloro-2-methoxyacridine was heated on the steam bath for about 15 minutes and 107 g. of 3-(2-hydroxyethylamino)propylamine was added. After heating for about 2 hours on the steam bath, the slightly cooled reaction mixture was poured into a stirred solution of 176 cc. of concentrated hydrochloric acid in 2 liters of acetone. After about 1 hour the product was filtered off, washed with acetone and then freed from most of the adhering phenol by stirring in hot acetone and filtering the mixture while hot. The yield was about 407 g. of solid. This solid was recrystallized by dissolving it in 4 liters of hot water, filtering the solution with decolorizing charcoal and adding 300 g. of sodium chloride. The yield (after oven drying for 48 hours at 95° C.) of 6-chloro-9-(3-(2-hydroxyethylamino)propylamino) - 2 - methoxyacridine dihydrochloride, M. P. 254–255° C. (corr.), was 275 g.

I claim:

1. A compound selected from the group consisting of 6-chloro-9-(3-(2-hydroxyethylamino) - propylamino) - 2 - methoxyacridine having the formula

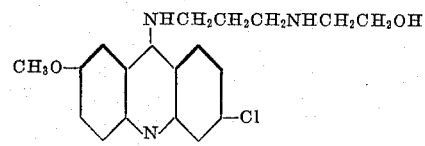

and acid addition salts thereof.

2. 6 - chloro - 9 - (3 - (2 - hydroxyethylamino)propylamino)-2-methoxyacridine dihydrochloride having the formula

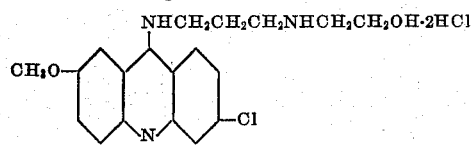

3. In the process of preparing 6-chloro-9-(3-(2 - hydroxyethylamino)propylamino) 2 - methoxyacridine having the formula

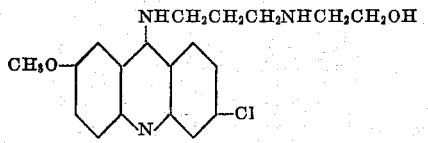

the step which comprises heating a member of the group consisting of 6,9-dichloro-2-methoxyacridine and 6-chloro-2-methoxy-9-phenoxyacridine hydrochloride with 3-(2-hydroxyethylamino)propylamine.

ALEXANDER R. SURREY.

REFERENCES CITED

The following references are of record in the file of this patent:

UNITED STATES PATENTS

| Number | Name | Date |
| --- | --- | --- |
| 2,113,357 | Mietzsch et al. | Apr. 5, 1938 |

OTHER REFERENCES

Shriner et al., Synthetic Antimalarials (published in Bloomington, Ind., 1941), page 30.

Mosher, Antimalarials: Natural and Synthetic (Edwards Bros., Ann Arbor, Mich., 1942), page 69.

Chem. Abst., vol. 37, page 2408 (1943) (Citing: Proc. Soc. Exp't'l. Biol. Med., vol. 52, pp. 90-91 (1943)).